(12) United States Patent
Sherman

(10) Patent No.: US 8,144,893 B2
(45) Date of Patent: Mar. 27, 2012

(54) MOBILE MICROPHONE

(76) Inventor: Kenneth N. Sherman, Las Vegas, NV (US)

( * ) Notice: Subject to any disclaimer, the term of this patent is extended or adjusted under 35 U.S.C. 154(b) by 871 days.

(21) Appl. No.: 12/220,791

(22) Filed: Jul. 28, 2008

(65) Prior Publication Data

US 2009/0060218 A1 Mar. 5, 2009

Related U.S. Application Data

(60) Provisional application No. 60/962,067, filed on Jul. 26, 2007.

(51) Int. Cl.
*H04B 3/00* (2006.01)
(52) U.S. Cl. ........................................................ 381/77
(58) Field of Classification Search .................... 381/77
See application file for complete search history.

(56) References Cited

U.S. PATENT DOCUMENTS

| | | | |
|---|---|---|---|
| 4,090,032 A * | 5/1978 | Schrader | 381/57 |
| 7,148,810 B2 * | 12/2006 | Bhat | 340/692 |
| 7,440,750 B2 * | 10/2008 | Howard | 455/416 |
| 7,792,539 B2 * | 9/2010 | Inselberg | 455/517 |
| 2002/0108125 A1 * | 8/2002 | Joao | 725/139 |
| 2006/0154657 A1 * | 7/2006 | Inselberg | 455/418 |
| 2007/0202900 A1 * | 8/2007 | Inselberg | 455/500 |
| 2008/0199022 A1 * | 8/2008 | Gatts | 381/82 |

* cited by examiner

*Primary Examiner* — Thao P. Le
(74) *Attorney, Agent, or Firm* — Mark A. Litman & Associates, P.A.

(57) ABSTRACT

A method centrally controls communication at a single venue. A central communications point with a moderator is provided. User information, at least at the venue, is provided to users for transmitting electronic signals to the central communication point. The moderator enables at least one electronic communication transmission from a user who has access to the central communication point to have at least part of the transmission broadcast at the venue or allow open communication from the user to be broadcast at the venue.

10 Claims, 1 Drawing Sheet

---

PROVIDING A COMMUNICATION AND DISPLAY VENUE

PROVIDING A CENTRAL COMMUNICATION POINT

ENABLING WIRELESS COMMUNICATION TRANSMISSION FROM USERS AT THE VENUE TO THE CENTRAL COMMUNICATION POINT

RECEIVING AUDIO AND/OR VIDEO COMMUNICATION TRANSMISSION FROM USERS AT THE CENTRAL COMMUNICATION POINT

RECEIVING AND/OR BROADCASTING THE COMMUNICATION TRANSMISSIONS FROM THE USERS

OPTIONALLY QUEUING THE COMMUNICATION TRANSMISSIONS FROM THE USERS

OPTIONALLY REBROADCASTING TEXTUAL COMMUNICATION TRANSMISSIONS FROM THE USERS

OPTIONALLY REBROADCASTING VIDEO COMMUNICATION TRANSMISSIONS FROM THE USERS

| |
|---|
| PROVIDING A COMMUNICATION AND DISPLAY VENUE |
| PROVIDING A CENTRAL COMMUNICATION POINT |
| ENABLING WIRELESS COMMUNICATION TRANSMISSION FROM USERS AT THE VENUE TO THE CENTRAL COMMUNICATION POINT |
| RECEIVING AUDIO AND/OR VIDEO COMMUNICATION TRANSMISSION FROM USERS AT THE CENTRAL COMMUNICATION POINT |
| RECEIVING AND/OR BROADCASTING THE COMMUNICATION TRANSMISSIONS FROM THE USERS |
| OPTIONALLY QUEUING THE COMMUNICATION TRANSMISSIONS FROM THE USERS |
| OPTIONALLY REBROADCASTING TEXTUAL COMMUNICATION TRANSMISSIONS FROM THE USERS |
| OPTIONALLY REBROADCASTING VIDEO COMMUNICATION TRANSMISSIONS FROM THE USERS |

MOBILE MICROPHONE

RELATED APPLICATIONS DATA

This Application claims priority from U.S. Provisional Patent Application No. 60/962,067, filed Jul. 26, 2007, and having the Title MASH-UP OF PHYSICAL SPACE AND CYBERSPACE.

BACKGROUND OF THE INVENTION

1. Field of the Invention

The present invention relates to the field of communications, particularly closed environment communication, local conferencing and the use of existing voice and data messaging systems in these fields of communication.

2. Background of the Art

There are numerous personal communication systems available on the market at the present time, such as cellular phones, PDA's, WiFi laptop processors (PC and MAC), iPhones, Blackberry-based technology and the like. The technology for these systems is still being underutilized and use has focused on their primary functions and not derivative or ancillary capabilities, especially when combined with other technologies.

In conferences, meetings, and classrooms, a question and answer period allows participants to ask questions from the floor. Without amplification, others in the room often have trouble hearing the speaker. Commonly, a microphone is provided in one or more aisles or a portable microphone can be passed to a person wishing to ask a question. This can force people to maneuver their seating towards the aisles where microphone access might be more easily available, or cause some significant and disturbing activity in audiences and lead to disruption of the underlying meeting. The movement of the microphones can be tedious, slow (e.g., from one extreme corner of a room to another) and cumbersome. There can also be such significant jousting for attention as to be disconcerting to participants and lack of control of the audience.

This system also may not work because a microphone is not available, does not work well, or there is not a portable microphone handy near the speaker. Often, the speaker doesn't properly use a microphone—waving it about or dropping it too far away from his or her mouth while speaking.

SUMMARY OF THE INVENTION

Conventional data transmission systems are used in a group setting for data transmission from participants to a central communication point (e.g., a podium) for sequential communication of information from participants, through the central communication point to the group. Individual data transmissions can be queued (if extended communications), received and downloaded if textual in content, or otherwise organized in a received or reception available status. Vocal communications can be broadcast on a conventional speaker/broadcast system by uploading the vocal communication from a participant, and electronically inputting it into a multi-speaker system (preferred) or a single speaker system. (less preferred). Data transmission may be fed into a display unit for display to the moderator only (to screen incoming materials) or directly onto a group display or a combination of the two.

BRIEF DESCRIPTION OF THE FIGURES

FIG. 1 shows a flow diagram of a process according to the present technology.

DETAILED DESCRIPTION OF THE INVENTION

A basic format for practicing technology according to the present disclosure can be described as possibly including systems and procedures as herein described.

A central communication point is established having visual and/or audio communication capability to a group. A speaker's table, podium, raised stage position and the like are useful, and the presence of an audio system (speakers, broadcast system, etc.) and/or a visual display system (e.g., projector, electronic panel display, etc.) is preferred to allow for general hearing and viewing by an audience. The system may also enable more distal attendance at the presentation/interaction, as with cameras and closed circuit or broadband distribution of content.

A central receiving function is provided at the central communication point. This may be a telephone system (with a phone number available to participants), a text receiving device (again a cellular phone, PDA, laptop or special instrumentation that can receive text or vocal transmission).

Individuals at the event (attendees) are provided with contact information for transmitting data to the central receiving function, such as a telephone number, website, e-mail address or any other access information needed to direct transmission of information to the central receiving function. It is highly desirable to have some form of queuing function at the central receiving function. For example, software and hardware is commercially available for call waiting, or queuing (as is done in commercial services such as airline reservations or customer service functions accessed by telephone.) Electronic textual information is more easily queued, as is common with stacking of e-mail transmissions in the order in which they are received.

At a prescribed time in the conference, or even during the conference before a question-and-answer session, individual attendees (local or distal) will transmit their communication to the central location and their transmissions will be accepted and/or queued according to defined criteria. One significant advantage of the system is that the individual users will be able to use their own personal equipment and their own personal communication network with which they are already familiar, and they will not have to learn an available system provided entirely by the event managers. Persons on AT&T, Verizon, Sprint, T-Mobile, or any other telephone transmission network can phone into a given number, just as laptop users (whether PC or MAC) can use their own web-carriers or network managers to deliver an e-mail to the central location, with no retraining needed.

The present invention allows participants in a conference, meeting room, classroom, or other venue to use their cell phones as microphones to address others in the room via the public address or sound amplification system.

In one embodiment, a mobile phone is used in combination with a public address or sound amplification system to allow the speaker's voice to be heard over the sound amplification system. The Present invention takes advantage of the fact that most conference and meeting attendees have brought their own mobile phone with them into the room.

Common sound amplification systems use one or more microphones wired or wirelessly connected to a public address or sound amplification system through specified inputs called microphone inputs, line inputs, auxiliary inputs, etc. Each microphone can be equipped with its own ON/OFF switch. If more than one microphone is turned on at the same time, the operator can select one particular microphone, using an input switch on the preamplifier or the amplifier, or by using software (Macro Media Flash Player is one example) so that only one microphone input is activated at one time. Sometimes, a single microphone is passed from one speaker to another.

In the Mobile Microphone™ communication system disclosed herein, each person who wants to speak uses his mobile phone to call the phone number that is unique to the telephone receiver(s) in the central communications point which, in turn, is connected to the sound amplification system. The phone number for each system, or room might be listed in a program or posted at the front of the room. Remote users can take advantage of the system to call the room from their remote location, in which case the attendees hear the question through the sound amplification system. When the attendee's phone calls the provided number, the call is directed to an apparatus that performs some, or all, of the following functions:

1. The apparatus receives and answers the phone call.
2. The apparatus can then perform one or more of the following:
   a. A recorded voice acknowledges to the caller that the call has been successfully connected. It may tell the caller his or her place in the queue.
   b. The apparatus sets a line level (amount of signal amplification) according to the strength of the caller's signal in order to provide the preamplifier section with an optimum signal-to-noise ratio. The apparatus' ability to measure the strength of the caller's signal may require that the caller speak a few words.
   c. The apparatus passes the audio signal to the preamplifier through its own amplifier stage which adjusts the signal both for volume and output impedance (to match the input impedance of the preamplifier) directly to the "microphone", "mic" or, sometimes, the "line input," of the existing sound system.
   d. The sound system then treats the input in the same manner as it treats a microphone signal.
3. If the call is not passed through directly, the apparatus may do any of the following:
   a. The apparatus can accept calls in an order of priority (the basis of which can be established by the event organizer and communicated to the participants).
      i. The apparatus can assign a place in a queue depending on any number of possible criteria such as when the call was received, the area code of the caller, the position of the caller in the room, the comparative quality of audio signal, a priority code punched in by the caller, etc.
   b. The apparatus can call back callers, in time to establish the connection, when it becomes a caller's turn to speak.
      i. The apparatus can record the phone number of the caller,
      ii. The apparatus can hang up the phone, and dial the caller back when the caller's turn to ask a question comes up.
   c. The apparatus can put the call on hold, and take the call off hold, when the caller's turn comes up.
4. Since most calls are questions from the audience interspersed with answers by the person to whom the question is addressed, the apparatus can avoid feedback or simultaneous input from speaker and respondent by allowing a caller to
   a. Ask a question and hang up.
      i. The question can be recorded and played back when the caller's turn comes up.
   b. Ask a question and stay on the line. (The caller can put his/her phone on mute or the moderator can put the call on mute. The apparatus can put the call on mute while the respondent is answering.) (An automatic delay can be built in so that a follow-up question is less likely to overlap an answer.)
   c. The apparatus can employ other feedback-prevention techniques such as the introduction of a short delay.

There are also some additional features that may be combined into the system as already described.

The system may include a method that centrally controls communication at a single venue. A central communication point with a moderator is provided. User information, at least at the venue, is provided by users for transmitting electronic signals to the central communication point. The moderator enables at least one electronic communication transmission from a user who has access to the central communication point to have at least part of the transmission broadcast at the venue or allow open communication from the user to be broadcast at the venue. The user information may be transmitted by wireless cellular phone transmission to a telephone system at the central communication point. The user information may be transmitted by WiFi processor-based transmission to a processor system at the central communication point. The processor system at the central communication point may receive transmission through a hard wire system or a WiFi system.

The electronic communication transmission may comprise or consist of textual information, video information and/or audio information. Each electronic communication from a user may be queued for response at the central communication point.

In order to accommodate more simultaneous callers than can be handled by the telephone receiver(s) in the central communications point, the phone number provided to the attendees may be that of a telephone call center which can receive simultaneous, multiple calls, buffer, prioritize, store, and redirect them one-at-a-time to the telephone receiver in the central communication point.

GPS Inside Buildings.

Location information in buildings is required to offer many of the services described earlier in the present Application. In case new types of GPS receivers capable of receiving and using satellite signals indoors are not available, the following system allows indoor reception using only conventional GPS receivers. The system may use fixed indoor (or dedicated to the building) transmitters that replicate the signals coming from GPS satellites. A minimum of three or four transmitters may be used and more than twelve transmitters tends to be superfluous. This enables cell phones, computers, and GPS receivers to use GPS in buildings. The fixed indoor transmitters within the building either retransmit actual signals from satellites or reproduce their position data along with the same atomic clock data understood by conventional GPS receivers. Preferably four transmitters, plus others to deal with blind spots, would be required. Power would only have to be sufficient to penetrate interior walls. Alternatively, transmitters would be located in each room and weak enough to eliminate the effect of reflections. GPS receivers will treat reflections as noise if the reflections are weak enough relative to the primary signal.

A system of fixed RFID transmitters and portable RFID receivers would be used to augment the GPS signals if the GPS signals do not provide enough accuracy. In this case, RFID would be carried by individuals and be attached to gaming machines, cash carrying trolleys, parking spaces, bathroom stalls, etc. as needed.

System Using Projected 2-Dimensional Bar Code to Give Access to Meeting Video & Audio A Two-Dimensional Barcode (often, concentric partial rings) is generated in a computer and projected on the wall or screen for the attendees to see. The Barcode contains a URL that will take the user to a website that shows the video and audio for the conference session. The Barcode also contains a password that restricts access to the URL to only people in the room. (User does not know password or see it in the URL display.) System uses cell phone, stand-alone, or computer camera. The information provided by the Bar Code is transferred from the camera to the user's computer. Software uses the barcode information to turn on the browser, create access to a local wide-area or WI FI network offered free to the user. Upon connection, it fills in the password information automatically. (And it records the session for archiving and later retrieval by the user, and it records data of the event for the conference organizer.) Part of the system is software for the website which asks for the password and sizes the video for the particular browser and device (e.g. cell phone or computer by type and screen size.

System and Apparatus for Displaying Web Pages in Response to Conversation

As people talk, a microphone (in a computer, cell phone, lavaliere, or fixed) picks up voices. The voices are translated to text. A software system searches the text to determine the current theme of the conversation. It works similar to a search engine where logical choices are made from context. A search engine then finds the most probable corresponding URL(s). Each selected URL's website is displayed. The display stays until the conversation appears to have changed its subject matter. The user is offered one or a plurality of web pages from which to choose. Parameters can be set by users including how long a website is displayed before the display is refreshed with a new site in response to the conversation.

Although specific examples and numbers have been provided, one skilled in the art can comprehend additional features and alternative elements that may be substituted for the specific technologies and components described herein.

What is claimed:

1. A method for centrally controlling communication at a single venue with multiple participants in an audience, the method comprising:

providing a central communication point with a moderator, the central communication point having a transmission system able to transmit information simultaneously to the multiple participants in the audience;

providing multiple user directed transmitters, at least at the venue, for transmitting electronic signals from individual users to the central communication point;

the central transmission system enabling at least one electronic communication transmission from a user who has transmission communication access to the central communication point to have at least part of the user transmission broadcast to multiple users at the venue or allow open communication from the user to multiple participants at the venue, with sound transmission from the user provided to the multiple participants as sound transmission and electronic transmission from the user being provided to multiple participants as an electronic transmission.

2. The method of claim 1 wherein the user sound information is transmitted by wireless cellular phone transmission to a telephone system at the central communication point and the sound transmission from the user is provided to the multiple participants as sound transmission.

3. The method of claim 1 wherein the user information is electronic information transmitted by WiFi processor-based transmission to a processor system at the central communication point and the electronic transmission from the user is provided to multiple participants as an electronic transmission.

4. The method of claim 2 wherein the central communication point receives sound transmission through a wireless telephone connection and transmits the sound information by way of a public address system or sound amplification system.

5. The method of claim 3 wherein the processor system at the central communication point receives transmission through a WiFi system.

6. The method of claim 1 wherein the electronic communication transmission comprises textual information from a cell phone or computer.

7. The method of claim 1 wherein the electronic communication transmission comprises audio information.

8. The method of claim 1 wherein each electronic communication from a user is queued for response at the central communication point.

9. The method of claim 4 wherein each electronic communication from a user is queued for response at the central communication point.

10. The method of claim 5 wherein each electronic communication from a user is queued for response at the central communication point.

* * * * *